June 23, 1936.  C. J. KELLER ET AL  2,045,087
INSULATING MACHINE
Filed March 21, 1932  5 Sheets-Sheet 1

Fig. 5

Patented June 23, 1936

2,045,087

UNITED STATES PATENT OFFICE 2,045,087

INSULATING MACHINE

Clarence J. Keller and John Q. Holmes, Anderson, Ind., assignors, by mesne assignments, to General Motors Corporation, Detroit, Mich., a corporation of Delaware Application March 21, 1932, Serial No. 600,352

52 Claims. (Cl. 173—244)

This invention relates to a machine for cutting collars from a rubber tube and for stretching each collar to facilitate inserting a conductor into it in order to insulate the conductor.

It is among the objects of the present invention to provide a machine which successively and automatically cuts short pieces of rubber collars from a supply of rubber tubing, feeds these collars to an assembly position and then stretches them in order to facilitate the introduction of a conductor by an operator.

Another object of the present invention is to prevent damage to the machine when the operator should overlook one or more rubber collars which pass the assembly position without being assembled with a conductor.

Further objects and advantages of the present invention will be apparent from the following description, reference being had to the accompanying drawings wherein a preferred embodiment of one form of the present invention is clearly shown.

Figure 3:
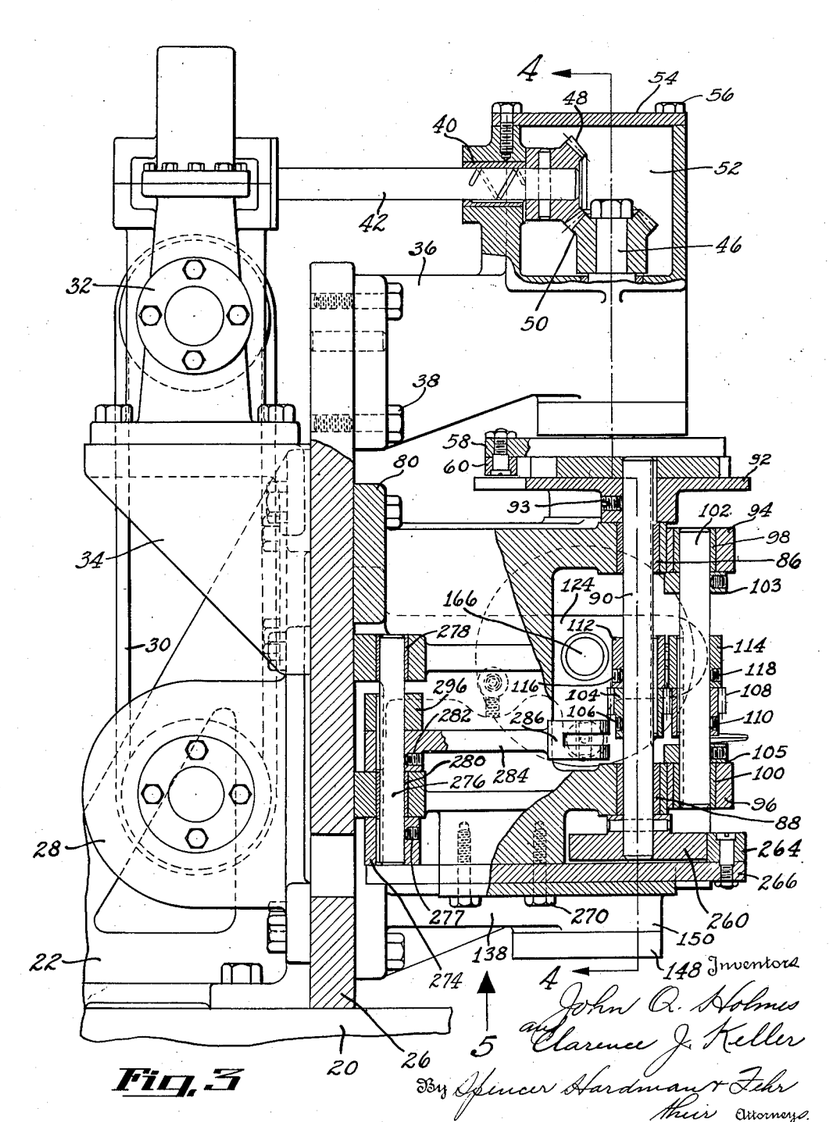
Fig. 3 is a side elevation of the machine partly shown in section, the section being taken substantially along the line 3—3 of Fig. 4.

Referring to the drawings the numeral 20 represents a base for the entire machine, standards 22 and 24 secure a wall 26 to the base 20 transverse thereof. An electric motor 28, mounted on the wall 26 drives by a belt connection 30 the gears of a speed reducer 32 which is supported by a pedestal 34 also mounted on the wall 26 as best shown in Fig. 3. A recessed bracket 36 mounted on the wall 26 opposite the speed reducer 32 by bolts 38 provides a bearing 40 for the free end of the slow shaft 42 of the speed reducer. The bracket 36 provides another bearing 44 (shown in Fig. 4) for a stub-shaft 46 which is transverse of the shaft 42. Bevel gears 48 and 50 are mounted on the ends of the shafts 42 and 46, respectively, which project into the recess 52 of the bracket 36 and are in mesh with each other. A plate 54 is secured to the bracket 36 by bolts 56 and covers the recess 52. A Geneva gear driver comprising a plate 58 and an anti-friction roller 60 is keyed to the other end of shaft 46. A ball bearing 62 located in the bracket 36 and intermediate the bearing 44 and the Geneva gear driver is adapted to take up the appreciably varying lateral thrust of the stub shaft 46 caused by the operation of the Geneva gear driver. A plate 64 secured to the bracket 36 by screws 66 retains the ball bearing in position. A nut 68 received by the threaded end 70 of the stub shaft retains the Geneva gear driver in firm engagement with a loose collar 72 on the stub shaft 46 which spaces the Geneva gear driver from the ball bearing.

Feeding and shearing mechanisms

Figures 1, 2, 10, 11:
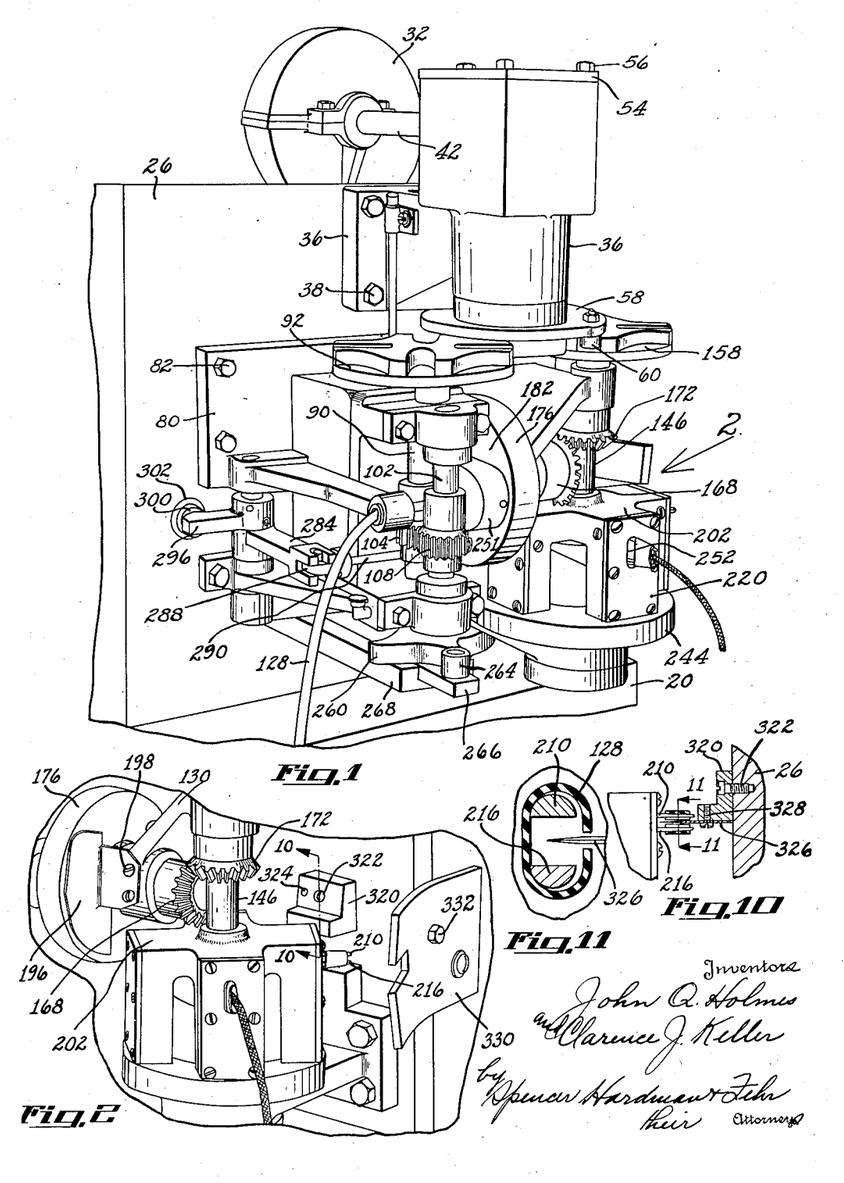
Fig. 1 is a perspective view of the machine.
Fig. 2 is a fragmentary perspective view of the machine looking in the direction of the arrow 2 in Fig. 1.
Fig. 10 is a fragmentary sectional view taken substantially along the line 10—10 of Fig. 2.
Fig. 11 is an enlarged sectional view taken on the line 11—11 of Fig. 10.

Referring more particularly to Figs. 1 to 4, inclusive, a bracket 80 is shown mounted on the wall 26 by bolts 82 and located thereon by pins 84. This bracket comprises bearings 86 and 88 for rotation of a shaft 90 about an axis parallel to the stub shaft 46. A Geneva gear 92 which is in mesh with the Geneva gear driver is splined to one end of shaft 90 and fixed thereto by a set screw 93. Blocks 94 and 96 are mounted on the bracket 80 adjacent the bearings 86 and 88, respectively, and provide bearings 98 and 100, respectively, for rotation of a shaft 102 about an axis parallel to shaft 90 as best shown in Figs. 1 and 3. Axial thrust of the shaft 102 is taken up in either direction by adjustably mounted collars 103 and 105 on said shaft which rest against the bearings 98 and 100, respectively. A gear 104 splined to the shaft 90 and adjustably fixed thereto by a set screw 106 meshes with a gear 108 splined to the shaft 102 and adjustably fixed thereto by a set screw 110. Feed rolls 112 and 114 of smaller diameter than the pitch diameter of the gears 104 and 108 are splined to the shafts 90 and 102, respectively and adjustably fixed thereto by set screws 116 and 118, respectively. It can be readily understood from the foregoing that the shafts 90 and 102 and also the feed rolls 112 and 114 rotate in unison. Tubular guide pieces 120 and 122 are pressfitted into the bracket 80 and a bracket 124, respectively, the bracket 124 being mounted on the wall 26 by bolts 127 and located thereon by pins 129. The guide pieces are so located on the brackets that a rubber tube 128 which extends through both guides passes intermediate the feed rolls 112 and 114.

Figures 4, 7, 8, 9:
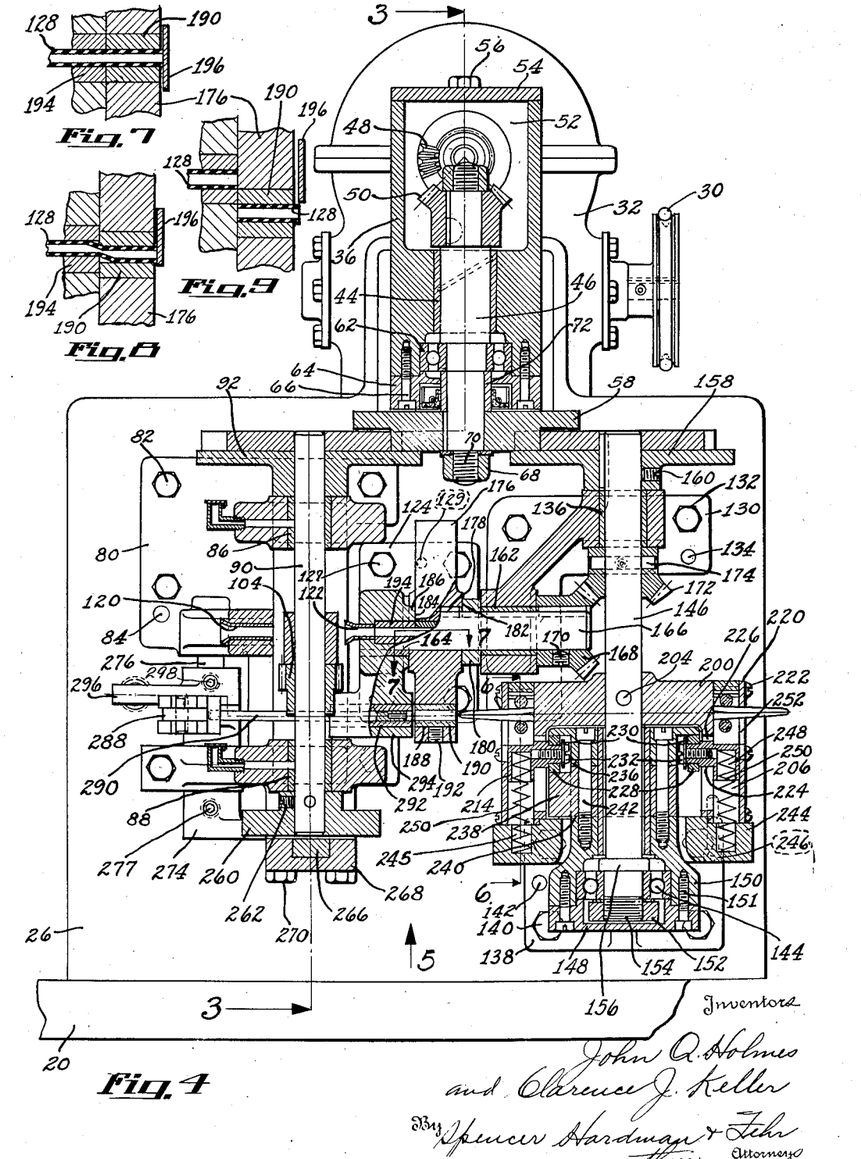
Fig. 4 is a sectional view taken along the line 4—4 of Fig. 3.
Fig. 7 is an enlarged fragmentary sectional view taken substantially along the line 7—7 of Fig. 4, and showing the position of the tube shearing means before the shearing operation.
Figs. 8 and 9 are sectional views similar to Fig. 7 showing successive steps during the shearing operation.
Figure 5:
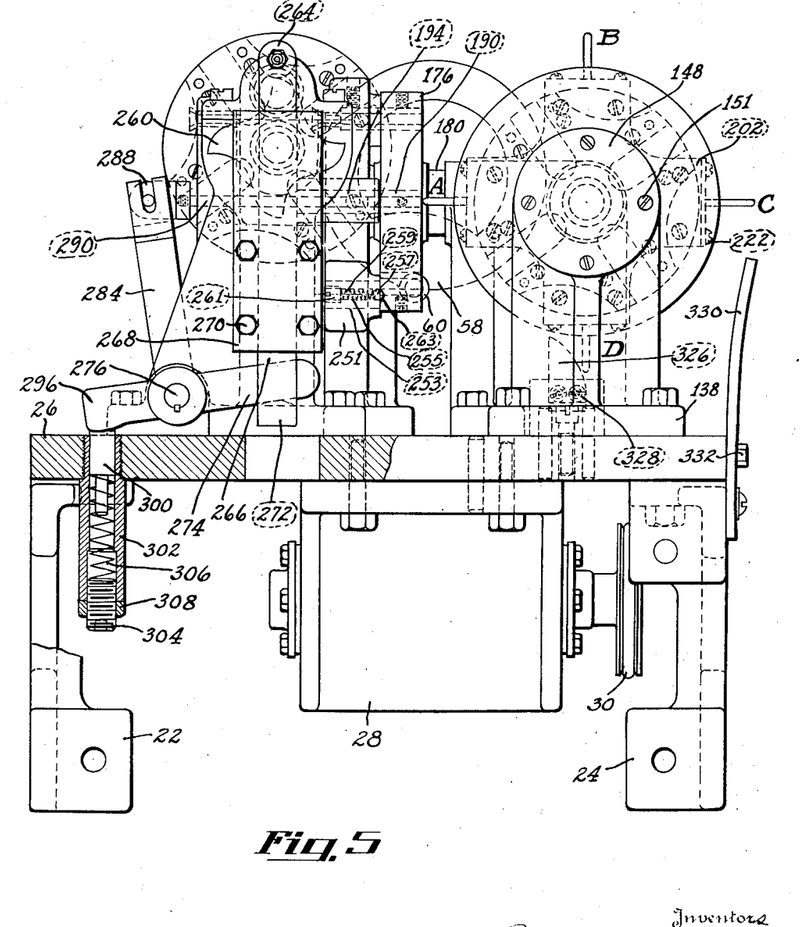
Fig. 5 is a bottom view of the machine looking in the direction of the arrow 5 in Fig. 3.

A bracket 130 is mounted on the wall 26 by bolts 132 and located thereon by pins 134 and provides a bearing 136. Another bracket 138, also mounted on the wall 26 by bolts 140 and located thereon by pins 142 supports a ball bearing 144 which together with the bearing 136 supports a shaft 146 for rotation about an axis parallel to the axis of the stub shaft 46. A plate 148 which is secured to a boss 150 of the bracket 138 by screws 151 retains the ball bearing 144 in position. A nut 152, received by the threaded end 154 of the shaft 146 maintains a collar 156 of the shaft 146 in engagement with the ball bearing 144. A Geneva gear 158 which is in mesh with the Geneva gear driver is splined to the end of the shaft 146 which extends beyond the bearing 136 and fixed to said shaft end by a set screw 160. The bracket 130 provides another bearing 162 which together with a bearing 164, provided by the bracket 124 supports a stub shaft 166 for rotation about an axis transverse of the shaft 146. A bevel gear 168, splined to the end of the shaft 166 which extends beyond the bearing 162 and fixed to said shaft end by a set screw 170 meshes with a bevel gear 172 which is pinned as at 174 to the shaft 146 adjacent the bearing 136 as best shown in Fig. 4. A disc 176 is keyed to the shaft 166 as at 178. A collar 180 loose on the shaft 166 and interposed between the disc and the bearing 162 maintains the plane surface 182 of the disc 176 adjacent the bearing 164 in sliding engagement with the plane surface 184 of a boss 186 provided by the bracket 124. The disc 176 provides a plurality of equally spaced openings 188 which receive hardened steel bushings 190, secured within said openings by set screws 192. In the present instance four of these bushings are provided for reasons which will appear obvious later. A similar bushing 194 is pressfitted into the boss 186 of the bracket 124 coaxially of the tubular guide 122. The bushings 190 and 194 have central openings of the same diameter as the tubular guides 120 and 122. Referring to Fig. 5 it will be noted that one of the bushings 190 of the disc 176 is in alignment with the bushing 194, this is the case whenever the disc 176 is at rest. A stop plate 196, secured to the bracket 130 by screws 198 as shown in Fig. 2 extends along the plane surface of disc 176 opposite the plane surface 182 thereof. The rubber tube 128 is fed through the guides 120 and 122 and through the bushing 194 into aligned bushing 190 of the disc 176 until stopped by the plate 196, which obstructs further feeding. As soon as the disc 176 starts an intermittent rotation the sharp edges of the bushing 194 and the aligned bushing 190 in the disc 176 shear a collar from the fed rubber tube, which length is determined by the depth of the opening in the aligned bushing 190 and the position of the stop plate 196 with respect to the adjacent plane surface of the disc 176. Figs. 7 to 9 inclusive show successive steps during the shearing operation.

Collar stretching device

Figure 6:
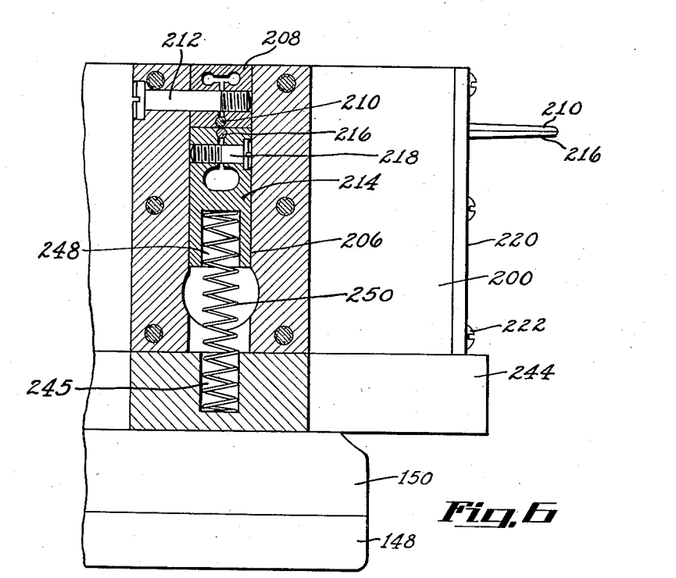
Fig. 6 is an enlarged sectional view of the stretching device taken substantially along the line 6—6 of Fig. 4.

Referring particularly to Figs. 4, 5 and 6 a block 200 having equally spaced projections 202 is pinned to the shaft 146 as at 204. In the present instance the block 200 provides four of these projections. Each one of these projections provides a longitudinal groove 206. A split member 208 which receives a stretching finger 210 is located within each of the grooves at one end thereof and secured to each projection 202 by a head screw 212 which extends through the projection and one side of the split member 208 and is threaded into the other side of said split member, thus securing the split member to the projection and also clamping the finger 210 to the split member, as best shown in Fig. 6. A second split member 214 is guided for movement in each groove 206 and has a stretching finger 216 clamped thereto by a screw 218. A cover plate 220 secured to the periphery of each projection 202 by screws 222 maintains each split member 214 within the groove 206. Each one of the split members 214 has a portion 224 which extends through an aperture 226 of each projection 202. An anti-friction roller 228 is secured to the end of the portion 224 of each movable member 214 by a washer 230 and a screw 232. A cam 236 resting on another cam 238 which in turn rests on the finished surface 240 of the boss 150 of the bracket 138 is secured to said boss by screws 242 which extend through the cam 238 and are threadedly received by said boss. A plate 244 having four equally spaced recesses 245 is so secured to the extensions 202 of the block 200 by screws 246 that these recesses are in alignment with recesses 248 provided by the split member 214. Springs 250, interposed between the plate 244 and each of the split members 214 and located in aligning recesses 245 and 248 urge the rollers 228 into engagement with the cam 236. Slots 252 in the cover plates 220 allow for movement of the stretching finger 216 which is clamped to the movable member 214. The cam action will be described under the mode of operation of this machine.

The bracket 124 also provides a boss 251 which has a plane surface abutting the plane surface 182 of the disc 176 and pressfittedly receives a steel piece 253 having a central opening 255 and a ball 257 therein. A spring 259 within the said opening 255 and intermediate the ball and a screw plug 261, threaded into the opening 255 urges said ball into engagement with said plane surface 182 of the disc 176. The disc 176 has four equally spaced countersinks 263 which are so located that the ball 257 will be urged into one of the aligned countersinks whenever the disc 176 is at rest thus arresting the disc in a position relative to the bracket 124.

It will be apparent from Fig. 4 that the block 200 is so located on the shaft 146 that the stretching fingers rotate in a plane which is parallel to the axes of the bushings 188 in the disc 176. The stretching fingers furthermore have to be in alignment with the bushing 188 in the disc 176 shown in the proper position in Fig. 4, whenever a pair of these cooperating fingers move to a resting position adjacent the above mentioned bushing 188.

Transfer device

Referring more particularly to Figs. 3, 4 and 5 a cam 260, splined to the end of the shaft 90 which extends beyond the bearing 88 and fixed to said shaft end by a set screw 262 cooperates with a cam roller 264 secured to a bar 266 slidable in a guide 268 which is secured to the bracket 80 by bolts 270. The bar 266 has a projection 272 which is engaged by a lever 274 splined to a shaft 276 and fixed thereto by a set screw 277. The shaft 276 is supported for rotation about an axis parallel to the shafts 90 and 102 in bearings 278 and 280 provided by the bracket 80. Splined to the shaft 276 and fixed thereto by a set screw 282 intermediate the bearings 278 and 280 is another lever 284 which has a forked end 286, floatingly pivotally receiving a member 288 which is threaded to an ejector rod 290. The ejector rod is guided through a bushing 292 which is pressfitted into a boss 294 provided by the bracket 124. A lever 296 which is also splined to the shaft 276 and fixed thereto by a set screw 298 engages a plunger 300 in a tubular member 302 threaded into the wall 26. A screw 304, threaded into the open end of the tubular member urges a spring 306 against said plunger. A nut 308 locks the screw 304 in adjusted position. The spring-pressed plunger 300 urges the lever 296 in such direction as to maintain the roller 264 in engagement with the cam 260 as will be readily understood from Fig. 5. It will furthermore be apparent from Fig. 4 that the ejector rod is in alignment with one of the bushings 188 in the disc 176 and this is the case whenever the disc is at rest. It may be stated in advance that the disc 176 rotates in such direction that the bushing 188 which aligns with the ejector rod carries a collar. Action of the cam 276 causes the ejector rod to advance into the aperture of the aligned bushing 188 of the disc 176 and transfer the collar from said aperture over the stretching fingers which, when in alignment with said aperture are engaging each other as will appear later.

Assembly of a collar with a conductor

At a certain resting position of the plate 200 the cam 236 will cause the finger 216 to maintain separated from the relatively stationary finger 210 during which time the operator introduces a conductor into the stretched collar which is carried by the fingers 210, 216. Upon continued movement of the block 200 the cam 236 allows the movable stretching finger to approach the other cooperating stretching finger until the movable stretching finger engages the introduced conductor. During such movement of the block 200 the operator strips the assembly of collar and conductor from the stretching fingers.

Safety device

Referring to Figs. 2, 5, 8 and 9, an angle 320 is shown fastened to the wall 26 by a screw 322 and located thereon by a pin 324. A razor blade 326 having its cutting edge facing the approaching stretching fingers 210, 216 is secured to said angle by screws 328. The cam 236 is so designed that it will cause the stretching finger 216 to separate from the relatively stationary stretching finger 210 when passing said razor blade during an intermittent rotation of the block 200. The angle 320 is so located on the wall 26 and the razor blade extends so far that a stretched collar which for one reason or another has passed the assembling position without having been assembled with a conductor and had not been stripped from the stretching fingers by the operator will be cut open by the razor blade intermediate the separated stretching fingers and thus removed from the non-assembled collar thereby preventing severe damage to the machine and especially the ejecting device, which continuously feeds a collar over cooperating stretching fingers. A guard 330 fastened to the wall 26 and the standard 24 by screws 332 prevents the operator from possible hand injury caused by the razor blade 326.

Mode of operation

Figure 12:
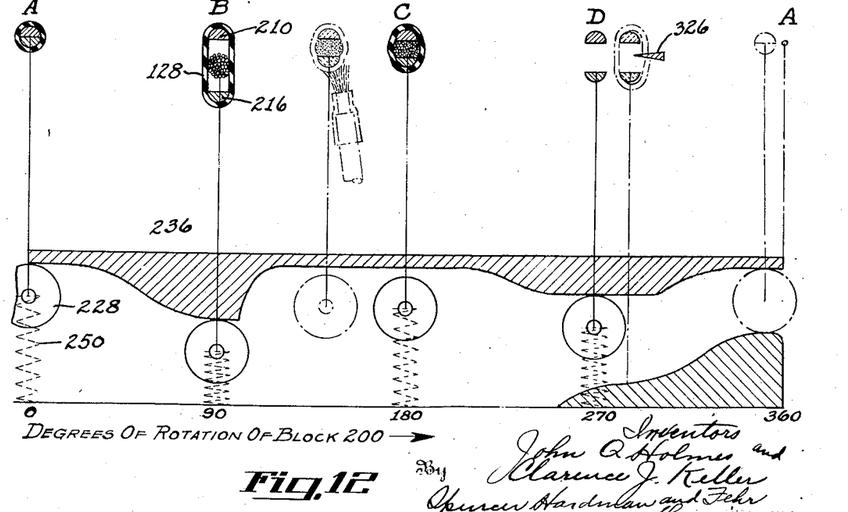
Fig. 12 is a diagrammatic view showing the cams of the stretching device in cooperative position and illustrating the different operations that take place during four intermittent quarter revolutions of the stretching device.

In the present instance the Geneva gears 92 and 158 are of a ratio 1 to 4. This explains the provision of the four bushings 188 in the disc 176, the provision of four pairs of stretching fingers 210, 216 and the four slopes of the ejector operating cam 260 because the disc 176 as well as the stretching finger carrying block 200 and the cam 260 are intermittently rotated by the Geneva gear drives. Since only one Geneva gear driver is provided for both Geneva gears it can readily be understood that the shafts 90 and 146 are alternatingly rotated. The feeding mechanism and the ejector device, both of which are actuated by the shaft 90 are simultaneously operating when the disc 176 and the stretching device is not operating and vice versa. Supposing the shaft 90 is just starting to rotate, the feeding mechanism will then feed the rubber tube 128 into the guide pieces 120 and 122 past the feed rolls 112, 114 and into the aperture of the bushing 188 which is in alignment with the bushing 194 until stopped by the plate 196. Slight overtravel of the feed rolls 112, 114 is neglectable because the feed rolls yieldably feed the rubber tube as follows from the preceding description of the feeding mechanism. The cam 260 will during the quarter revolution of the shaft 90 cause the ejector rod 290 to advance into the aperture of the bushing 188 shown in the proper position in Fig. 4, and transfer a collar from said aperture over the aligned stretching fingers 210, 216. When the continuously rotating Geneva gear driver starts to rotate the shaft 146, the disc 176 will rotate 90° due to the ratio 1 to 1 of the bevel gears 169, 172 which transmit motion from the shaft 146 to the disc carrying shaft 190. The process of shearing a collar from the fed rubber tube takes place during the earlier part of movement of the disc 176 as follows from the earlier description of the shearing mechanism. The disc 176 after its quarter revolution will stop in a position such that the collar carrying bushing 188 is in alignment with the ejector rod and one pair of stretching fingers. Concurrently with the disc 176 the block 200 starts to rotate. Referring now to Fig. 12 the roller 228 will ride along the slope a—b of the cam 236 and cause the stretching finger 216 to separate from finger 210 and thereby stretch the collar. This movement of the block 200 corresponds with the movement of the stretching fingers from position A to B as indicated in Fig. 5. The operator introduces the conductor into the stretched collar while the same is resting in position B and while the feeding mechanism is operative and a new collar transferred from the disc 176 over the pair of stretching fingers which previously moved from the position D to position A. During the following intermittent rotation of the block 200 the fingers in the position B move to position C during which movement the springs 250 move the stretching finger 216 toward the relatively stationary stretching finger 210 when the cam follower 228 rides over the descent c—d of the cam 236. The stretching finger 216 will approach the relatively stationary stretching finger 210 until it engages the conductor within the stretched collar. During the movement of the stretching fingers from the position B to the position C the operator strips the assembly collar and conductor from the stretching fingers. During the next following intermittent movement of the stretching fingers from the position C to position D the cam 236 causes the movable stretching finger to move away from the cooperating stretching finger as Fig. 12 clearly shows. During the last intermittent movement of the stretching fingers from the position D to the position A before completing one revolution, a non-assembled stretched collar will be cut open by the razor blade 326, this takes place after approximately 287° revolution of the block 200 counting from the position A. When the stretching fingers approach the position A the cam 238 positively moves the stretching finger 216 into engagement with the relatively stationary stretching finger 210 to make sure that these cooperating fingers are in engagement with each other when a new collar is received by these fingers in the position A.

While the form of embodiment of the present invention as herein disclosed, constitutes a preferred form, it is to be understood that other forms might be adopted, all coming within the scope of the claims which follow.

What is claimed is as follows:

1. A machine for assembling a rubber collar with a conductor comprising, in combination, a device for stretching a collar in order to receive the conductor; two cooperating members for cutting a length from a fed rubber tubing to form a collar, one of said members being movable and aligning the collar with the stretching device; and means for transferring the aligned collar to the stretching device.

2. A machine for assembling a rubber collar with a conductor comprising, in combination, a device for stretching a collar in order to receive the conductor; a device for feeding rubber tubing, said feeding device being out of alignment with the stretching device; two cooperating members for cutting a length from the fed rubber tubing to form a collar, one of said members being movable and aligning the collar with the stretching device; and means for transferring the aligned collar to the stretching device.

3. A machine for assembling a rubber collar with a conductor comprising, in combination, a device for stretching a collar in order to receive the conductor; a device for cutting a length from a fed rubber tubing to form a collar and for transferring the collar to the stretching device; and means for operating the devices in timed relation with each other.

4. A machine for assembling a rubber collar with a conductor comprising, in combination, a device for stretching a collar in order to receive the conductor; a device for feeding rubber tubing; a device for cutting a length from the fed rubber tubing to form a collar and for transferring the collar to the stretching device; and means for operating the devices in timed relation with each other.

5. A machine for assembling a rubber collar with a conductor comprising, in combination, a device for stretching a collar in order to receive the conductor; a device for supporting and properly aligning a collar with the stretching device and for transferring the collar to the stretching device; and means for operating the devices in timed relation with each other.

6. A machine for assembling a rubber collar with a conductor comprising, in combination, a device for stretching a collar in order to receive the conductor; a device for feeding rubber tubing; a device for supporting the foremost end of the fed tubing to be severed from the remainder of the tubing to form a collar, and for transferring the collar to the stretching device; and means for operating the devices in timed relation with each other.

7. A machine for assembling a rubber collar with a conductor comprising, in combination, a device for feeding rubber tubing; a device for cutting a length from the fed tubing to form a collar; a device actuated in response to operation of the cutting device for stretching the collar in order to receive the conductor; and a device for transferring the collar from the cutting device to the stretching device.

8. A machine for assembling a rubber collar with a conductor comprising, in combination, a device for feeding rubber tubing; a device for cutting a length from the fed tubing to form a collar; a device for stretching the collar; and means responsive to operation of the feeding device for placing the collar upon the stretching device.

9. A machine for assembling a rubber collar with a conductor comprising, in combination, a device for stretching a collar in order to receive the conductor; a device responsive to operation of the stretching device for cutting a length from a fed rubber tubing to form a collar; and a device for transferring the collar from the cutting device to the stretching device.

10. A machine for assembling a rubber collar with a conductor comprising, in combination, a device for feeding rubber tubing; a device for cutting a length from the fed tubing to form a collar; a device responsive to operation of the cutting device for stretching the collar in order to receive the conductor; and a device responsive to operation of the feeding device for transferring the collar from the cutting device to the stretching device.

11. A machine for assembling a rubber collar with a conductor comprising, in combination, a device for feeding rubber tubing; a device for cutting a length from the fed tubing to form a collar; a device responsive to operation of the cutting device for stretching the collar in order to receive the conductor; a device responsive to operation of the feeding device for transferring the collar from the cutting device to the stretching device; and means for operating the feeding device and the cutting device in timed relation with each other.

12. A machine for assembling a rubber collar with a conductor comprising, in combination, a device for cutting rubber tubing into equal lengths to form collars; a device for feeding rubber tubing to the cutting device; a device actuated in response to operation of the cutting device for stretching the collars; a device actuated in response to operation of the feeding device for transferring the collars from the cutting device to the stretching device; and means for alternately operating the cutting device and the feeding device.

13. A machine for assembling a rubber collar with a conductor comprising, in combination, a device for cutting rubber tubing into equal lengths to form collars; a device for feeding rubber tubing to the cutting device; means for stretching the collars; a cam for actuating the stretching means upon relative movement between said stretching means and the cam; means for causing such relative movement; and a device for transferring the collars from the cutting device to the stretching means.

14. A machine for assembling a rubber collar with a conductor comprising, in combination, a device for cutting rubber tubing into equal lengths to form collars; a device for feeding rubber tubing to the cutting device; means for stretching the collars; a cam for actuating the stretching means upon relative movement between said stretching means and the cam; means actuated in response to operation of the cutting device for causing such relative movement; and a device for transferring the collars from the cutting device to the stretching means.

15. A machine for assembling a rubber collar with a conductor comprising, in combination, a plurality of means each for stretching a collar to receive the conductor, all of said stretching means being movable successively from a loading position to an assembly position for stretching collars in response to such movement; and means for placing a collar upon each stretching means while in loading position.

16. A machine for assembling a rubber collar with a conductor comprising, in combination, means for cutting equal lengths from a fed rubber tubing to form collars; a plurality of means each for stretching a collar to receive the conductor, all of said stretching means being movable successively from a loading position to an assembly position for stretching collars in response to such movement; and means for transferring a collar from the cutting means to a stretching means in loading position.

17. A machine for assembling a rubber collar with a conductor comprising, in combination, means for feeding rubber tubing; a plurality of means each for stretching a collar to receive the conductor, all of said stretching means being movable successively from a loading position to an assembly position for stretching collars in response to such movement; and a device for severing the foremost end of the fed tubing from the remainder thereof so as to form a collar and for transferring the collar to a stretching means in loading position.

18. A machine for assembling a rubber collar with a conductor comprising, in combination, means for feeding rubber tubing; means for cutting a length from the fed tubing to form a collar; means for stretching the collar to receive the conductor, said means being movable from a loading position to an assembly position for stretching the collar in response to such movement; and means for placing the collar upon the last said means while in the loading position.

19. A machine for assembling a rubber collar with a conductor comprising, in combination, means for cutting equal lengths from a fed rubber tubing to form collars; a plurality of means each for stretching a collar to receive the conductor, all of said means being successively moved in response to operation of the cutting means from a loading position to an assembly position for stretching collars in response to such movement; and means for transferring a collar from the cutting means to a stretching means in loading position.

20. A machine for assembling a rubber collar with a conductor comprising, in combination, means for feeding rubber tubing; a plurality of means each for stretching a collar to receive the conductor, all of said stretching means being movable successively from a loading position to an assembly position for stretching collars in response to such movement; means receiving the foremost end of the fed tubing, said means being actuated in response to movement of the stretching means for aligning a severed collar with a stretching means in loading position; means for severing the foremost end of the fed tubing so as to form a collar; and means for transferring a collar from said receiving and aligning means to a stretching means in loading position.

21. A machine for assembling a rubber collar with a conductor comprising, in combination, means for feeding rubber tubing; a plurality of means each for stretching a collar to receive the conductor, all of said stretching means being movable successively from a loading position to an assembly position for stretching collars in response to such movement; means receiving the foremost end of the fed tubing, said means being actuated in response to movement of the stretching means for aligning a severed collar with a stretching means in loading position; means for severing the foremost end of the fed tubing so as to form a collar; and means responsive to operation of the feeding means for transferring a collar from said receiving and aligning means to a stretching means in loading position.

22. A machine for assembling a rubber collar with a conductor comprising, in combination, means for feeding rubber tubing; means for cutting a length from the fed tubing to form a collar; means for stretching the collar to receive the conductor, said means being moved in response to operation of the cutting means from a loading position to an assembly position for stretching the collar in response to such movement; and means for transferring the collar from the cutting means to the stretching means in loading position.

23. A machine for assembling a rubber collar with a conductor comprising, in combination, means for feeding rubber tubing; means for cutting a length from the fed tubing to form a collar; means for stretching the collar to receive the conductor, said means being movable from a loading position to an assembly position for stretching the collar in response to such movement; and means responsive to operation of the feeding means for transferring the collar from the cutting means to the stretching means in loading position.

24. A machine for assembling a rubber collar with a conductor comprising, in combination, means for feeding rubber tubing; means for cutting a length from the fed tubing to form a collar; means for stretching the collar to receive the conductor, said means being moved in response to operation of the cutting means from a loading position to an assembly position for stretching the collar in response to such movement; and means responsive to operation of the feeding means for transferring the collar from the cutting means to the stretching means in loading position.

25. A machine for assembling a rubber collar with a conductor comprising, in combination, means for feeding rubber tubing; means for cutting a length from the fed tubing to form a collar; means for stretching the collar to receive the conductor, said means being movable from a loading position to an assembly position for stretching the collar in response to such movement; means responsive to operation of the feeding means for transferring the collar from the cutting means to the stretching means in loading position; and means for alternately operating the feeding means and the cutting means.

26. A machine for assembling a rubber collar with a conductor comprising, in combination, means for feeding rubber tubing; means for cutting a length from the fed tubing to form a collar; means for stretching the collar to receive the conductor, said means being moved in response to operation of the cutting means from a loading position to an assembly position for stretching the collar in response to such movement; means responsive to operation of the feeding means for transferring the collar from the cutting means to the stretching means in loading position; and means for alternately operating the feeding means and the cutting means.

27. A machine for assembling a rubber collar with a conductor comprising, in combination, a mechanism for feeding a rubber tube a predetermined distance; means for shearing a collar from the fed rubber tube; collar stretching means; a rod in alignment with the collar stretching means; means for moving a collar into alignment with the rod; and means for moving the rod so as to move the collar into engagement with the collar stretching means.

28. A machine for assembling a rubber collar with a conductor comprising, in combination, a mechanism for feeding a rubber tube a predetermined distance; collar stretching means; a rod in alignment with the stretching means; means for shearing a collar from the fed rubber tube and for moving the collar into alignment with said rod; and means for moving the rod so as to move the collar into engagement with the stretching means.

29. A machine for assembling a rubber collar with a conductor comprising, in combination, a rotatable disc having an aperture; a stationary apertured guide abutting the disc, the latter cooperating with the guide to shear a collar from a rubber tube; a mechanism for feeding the rubber tube a predetermined distance through the aligned apertures of the guide and disc; an ejector; means for rotating the disc to cause cooperation between the guide and disc to shear a collar from the fed rubber tube and in order to move the collar into alignment with the ejector; collar stretching means; and means for actuating the ejector so as to move the collar from the disc into engagement with the collar stretching means.

30. A machine for assembling a rubber collar with a conductor comprising, in combination, a rotatable disc having an aperture; a stationary apertured guide abutting said disc, the latter cooperating with the guide to shear a collar from a rubber tube; a mechanism for yieldingly feeding the rubber tube through the aligned apertures of the guide and disc; a stationary stop adjacent the disc for engaging the forward end of the fed rubber tube; an ejector; means for rotating the disc in order to cause cooperation between the guide and disc to shear a collar from the rubber tube and in order to move the collar into alignment with the ejector; collar stretching means; and means for actuating the ejector so as to move the collar from the disc into engagement with the stretching means.

31. A machine for assembling a rubber collar with a conductor comprising in combination, a drive shaft; driven shafts; means for intermittently rotating the driven shafts in response to rotation of the drive shaft; a rotatable disc having an aperture; a stationary apertured guide abutting said disc, the latter cooperating with the guide to shear a collar from a rubber tube; a mechanism actuated by one of the driven shafts for yieldingly feeding the rubber tube through the aligned apertures of the guide and disc; a stationary stop adjacent the disc for engaging the forward end of the fed rubber tube; an ejector; meshing bevel gears, one on one of the driven shafts, the other on the disc for rotating said disc in order to cause cooperation between the guide and disc to shear a collar from the rubber tube and in order to move the collar into alignment with the ejector; collar stretching means actuated in response to rotation of one of the driven shafts; and means on one of the driven shafts for actuating the ejector so as to move the collar from the disc into engagement with the collar stretching means.

32. A machine for assembling a rubber collar with a conductor comprising, in combination, a drive shaft; driven shafts; means for intermittently rotating the driven shafts in response to rotation of the drive shaft; a mechanism actuated by one of the driven shafts for feeding a rubber tube a predetermined distance; a device actuated in response to rotation of one of the driven shafts for shearing a collar from the fed rubber tube; a stretching finger on one of the driven shafts, said finger providing a guide; a second stretching finger movable in said guide; means for moving the collar over the stretching fingers; means on one of the driven shafts for actuating the last said means; and means for moving the second finger relative to the other finger in response to rotation of the finger carrying shaft, said means also causing the second finger to be in engagement with the other finger when the collar moving means is operative.

33. A machine for assembling a rubber collar with a conductor comprising in combination, a drive shaft; driven shafts; means for intermittently rotating the driven shafts in response to rotation of the drive shaft; a mechanism actuated by one of the driven shafts for feeding a rubber tube a predetermined distance; a device actuated in response to rotation of one of the driven shafts for shearing a collar from the fed rubber tube; a stretching finger on one of the driven shafts, said finger providing a guide; a second stretching finger movable in said guide and yieldingly urged into engagement with the other finger; a stationary cam cooperating with the second stretching finger for moving the latter away from the other finger upon movement of the fingers, said cam being so designed as to allow the second finger to engage the other finger when the collar moving means is operative.

34. In a machine for assembling a rubber collar with a conductor, two members, one being stationary and the other rotatable, the rotatable member having a plurality of equi-angularly spaced means, each for supporting a collar, said means being caused by the stationary member to deform the supported collars upon angular movement of each from a preassigned loading station to a preassigned assembly station so that the collars are deformed in successive order.

35. In a machine for assembling a rubber collar with a conductor, the combination of a rotatable block; a stretching finger projecting from said block; another stretching finger parallel to the first mentioned finger and supported by the block for movement toward and away from said first mentioned finger; and means for moving said other finger relative to said first mentioned finger in response to rotation of the block relative to said means.

36. In a machine for assembling a rubber collar with a conductor, the combination of a rotatable block provided with a groove; a pair of stretching fingers carried by the block and located in the groove thereof and one of the fingers being movable toward and away from the other finger; and means for moving the movable finger relative to the other finger in response to rotation of the block relative to said means.

37. In a machine for assembling a rubber collar with a conductor, the combination of, a rotatable block provided with a groove; a pair of stretching fingers carried by the block and located in the groove thereof, and one of the fingers being movable toward and away from the other finger; and a stationary cam cooperating with the movable finger for moving the same relative to the other finger upon rotation of the block.

38. A machine for assembling a rubber collar with a conductor, the combination of a block provided with a groove; a split member located in said groove and fastened to the block; a stretching finger clamped to said member; a second split member movable in said groove; a second stretching finger clamped to the movable member; means for moving the movable member relative to the other member in response to relative movement between the block and said means; and means for effecting relative movement between the block and the last said means.

39. In a machine for assembling a rubber collar with a conductor, the combination of, a block provided with a groove; a split member located in said groove and fastened to the block; a stretching finger clamped to said member; a second split member movable in said groove; a second stretching finger clamped to the movable member; a spring intermediate the block and the movable member urging the latter into engagement with the other member; a cam follower on the movable member, a cam cooperating with the cam follower for moving the movable member away from the other member upon relative movement between the block and the cam; and means for effecting relative movement between the block and the cam.

40. In a machine for assembling a rubber collar with a conductor, two members, one of the members being rotatable and the other stationary and one of the members having means for supporting a collar, said means being caused by one of the members successively to deform the supported collar and to permit the deformed collar to recover substantially from its deformation upon continuous rotation of the rotatable member relative to the other member.

41. In a machine for assembling a rubber collar with a conductor, two members, one being stationary and the other rotatable, the rotatable member having means for supporting a collar, said means being caused by the stationary member successively to deform the supported collar and to permit the deformed collar to recover from its deformation upon continuous rotation of the rotatable member relative to the stationary member.

42. In a machine for assembling a rubber collar with a conductor, two members, one being stationary and the other rotatable, one of the members having a plurality of equi-angularly spaced means, each for supporting a collar, said means being caused by one of the members successively to deform the supported collars in successive order and to permit the deformed collars to recover substantially from their deformation upon rotation of the rotatable member relative to the stationary member.

43. In a machine for assembling a rubber collar with a conductor, two members, one being stationary and the other rotatable, the rotatable member having a plurality of equi-angularly spaced means, each for supporting a collar, said means being caused by the stationary member successively to deform the supported collars and to permit the same to recover substantially from their deformation upon a preassigned angular movement of each supported collar beyond a preassigned loading station so that the collars are deformed and permitted to recover from their deformation in successive order.

44. In a machine for assembling a rubber collar with a conductor, the combination of two members, one being stationary and the other rotatable, the rotatable member having a plurality of equi-angularly spaced means, each for supporting a collar, said means being caused by the stationary member to deform the supported collars upon angular movement of the same from one preassigned loading station into one preassigned assembly station so that the collars are deformed in successive order; means for intermittently rotating the rotatable member so as to move a supported collar from the loading station into the assembly station; and means actuated in timed relationship with the operation of the intermittent rotating means for supplying each collar supporting means with a collar when arriving in the loading station.

45. In a machine for assembling a rubber collar with a conductor, the combination of two members, one being stationary and the other rotatable, the rotatable member having a plurality of equi-angularly spaced means, each for supporting a collar, said means being caused by the stationary member successively to deform the supported collars and to permit the same to recover substantially from their deformation upon a preassigned angular movement of each supported collar beyond a preassigned loading station so that the collars are deformed and permitted to recover from their deformation in successive order; means for intermittently rotating the rotatable member so as to move a supported collar from the loading station through said predetermined angle; and means actuated in timed relationship with the operation of the intermittent rotating means for supplying each collar supporting means with a collar when arriving in the loading station.

46. In a machine for assembling a rubber collar with a conductor, the combination of two members, one being stationary and the other rotatable, the rotatable member having means for supporting a collar, said means being caused by the stationary member successively to deform a collar and to permit the same to recover substantially from its deformation and to deform the supported collar a second time when not orderly removed from the supporting means during the preceding recovery from its deformation upon rotation of the rotatable member relative to the stationary member; and stationary means for removing from the collar supporting means a collar, said means being so located relative to the stationary member that a supported collar during its second deformation passes said stationary means and is thereby removed from the collar supporting means.

47. In a machine for assembling a rubber collar with a conductor, the combination of a rotatable block; a pair of stretching fingers carried by the block and one of the fingers being movable toward and away from the other finger; means for moving the movable finger relative to the other finger in response to rotation of the block through a predetermined cycle; a stationary severing means; and means for moving the movable finger away from the other finger in response to rotation of the block through another predetermined cycle so as to stretch a non-assembled collar and present the same to the severing means in order to remove the collar from the fingers.

48. In a machine for assembling a rubber collar with a conductor, the combination of a rotatable block; a pair of stretching fingers carried by the block, one of said fingers being movable toward and away from the other finger; a stationary razor blade; and means for moving the movable finger relative to the other finger in response to rotation of the block through a predetermined cycle, said means also moving the movable finger away from the other finger in response to rotation of the block through another predetermined cycle so as to stretch a non-assembled collar and present the same to the cutting edge of the razor blade in order to remove the collar from the fingers.

49. In a machine for assembling a rubber collar with a conductor, the combination of a rotatable block; a pair of stretching fingers carried by the block, one of said fingers being movable toward and away from the other finger; a spring urging the movable finger into engagement with the other finger; a stationary cam cooperating with the movable finger for moving the same relative to the other finger in response to rotation of the block through a predetermined cycle; a stationary severing means; and means for moving the movable finger away from the other finger in response to rotation of the block through another predetermined cycle so as to stretch a non-assembled collar and present the same to the severing means in order to remove the collar from the fingers.

50. In a machine for assembling a rubber collar with a conductor, the combination of a rotatable block; a pair of stretching fingers carried by the block, one of said fingers being movable toward and away from the other finger; a spring urging the movable finger into engagement with the other finger; a stationary cam cooperating with the movable finger for moving the same relative to the other finger in response to rotation of the block through a predetermined cycle; a stationary severing means; a cam for moving the movable finger away from the other finger upon rotation of the block through another predetermined cycle so as to stretch a non-assembled collar and present the same to the severing means in order to remove the collar from the fingers; and another cam cooperating with the movable finger for positively moving the same into engagement with the other finger upon rotation of the block through still another predetermined cycle.

51. In a machine for assembling a rubber collar with a conductor, the combination of a rotatable block; a pair of stretching fingers carried by the block, one of said fingers being movable toward and away from the other finger; a stationary severing means; a spring urging the second finger into engagement with the other finger; and a stationary cam cooperating with the movable finger for moving the same toward the other finger upon rotation of the block through a predetermined cycle and also for moving said movable finger away from the other finger upon rotation of the block through another predetermined cycle so as to stretch a non-assembled collar and present the same to the severing means in order to remove the collar from the fingers.

52. In a machine for assembling a rubber collar with a conductor, the combination of two members, one being stationary and the other rotatable, the rotatable member having a pair of collar receiving fingers, one of which is movable relative to the other in a direction parallel to the axis of rotation of the rotatable member and normally yieldingly urged in one direction, said movable finger being caused by the stationary member upon one complete revolution of the rotatable member relative to the stationary member successively to move in one direction so as to deform the supported collar, to move yieldingly in the opposite direction thereby permitting the supported collar to recover from its deformation, to move in said one direction so as to deform the supported collar a second time when not orderly removed from the fingers during the precedent recovery from its deformation and to move yieldingly in said opposite direction into a position in which both fingers may receive a new collar; and stationary means for removing from the fingers a collar, said means being so located relative to the stationary member that a supported collar during its second deformation passes said stationary means and is thereby removed from the fingers.

CLARENCE J. KELLER.
JOHN Q. HOLMES.